Dec. 10, 1963  P. J. WEAVER  3,113,490
FLUID MOTOR
Filed March 16, 1961
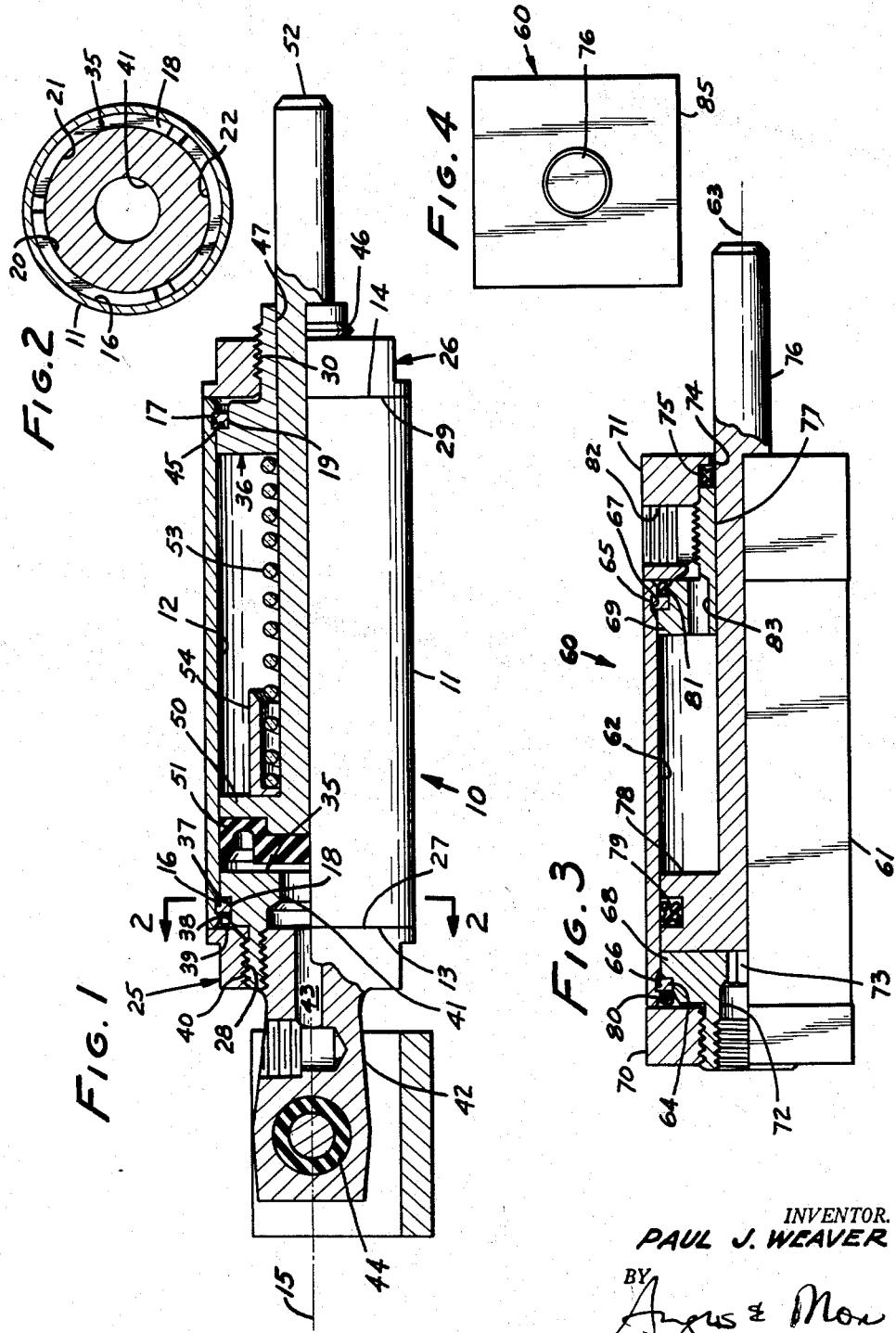
INVENTOR.
PAUL J. WEAVER
BY
ATTORNEYS.

3,113,490
FLUID MOTOR
Paul J. Weaver, Pasadena, Calif., assignor to Stanley G. Harwood, 915 Lyndon St., South Pasadena, Calif.
Filed Mar. 16, 1961, Ser. No. 96,217
4 Claims. (Cl. 92—128)

This invention relates to a fluid motor of the piston-cylinder type.

There is a continuing need for fluid motors whose bulk exceeds the volume of the stroke portion of the cylinder bore by a small a margin as possible. In fulfilling this need, it would be advantageous to begin by using a thin-walled cylinder, and keeping the bulk of the end caps and other structure as much within it as possible. However, conventional construction for the attachment of end caps has hitherto required the use of either internal or external threads on the cylinder. Either way, this increases the cross-section of the device because the cylinder wall needs to be made thick to take either kind of thread. Furthermore, if external threads are used, the increase is augmented because the end cap on the outside of the cylinder adds external bulk.

Because these threads pose something of a problem, either in weakening the wall or in requiring a thicker wall so enough wall thickness is provided, resort has been had to tie rods which pull a pair of caps toward each other against a cylinder that is placed between them. While the cylinder wall can then be made thin, the bulk saving of a thin-walled cylinder is lost because of the increase in bulk caused by the tie rods and external end caps.

It is an object of this invention to provide a fluid motor whose lateral dimensions are not significantly greater than those of the bore, and in which internally attached end caps can be mounted in a thin-walled cylinder, thereby keeping the lateral dimensions of the device to a minimum. This construction also minimizes the envelope length as compared to the piston stroke. The resulting motor is particularly well suited for use in applications requiring small bore motors operating at shop pressures. It is also well suited for use in larger cylinders operating at higher pressures. However, in the larger sizes, the need for economy of envelope bulk is not ordinarily of enough importance to call for a departure from conventional structures.

It is another object of this invention to provide a fluid motor which can expeditiously be assembled from a few parts which are readily adaptable for interchangeability among motors of various sizes and configurations. Then a relatively few individual parts can be utilized to make up a considerable number of motor configurations and sizes.

A fluid motor according to this invention includes a cylinder with a cylindrical internal bore. There is an internal ring groove in the wall of the bore adjacent to each of its ends. A first and a second end cap abut the first and second ends of the cylinder and each has an internally threaded hole through it. A retainer is seated in each of the ring grooves and projects radially into the bore. A first and a second end clamp each has a shoulder adapted to enter the bore and engage the respective retainer. An externally threaded neck on each end clamp enters and makes threaded engagement in the threaded hole in the respective end cap. Thus the end cap is drawn against the cylinder end and the end clamp is drawn against the retainer ring, thereby holding the end clamps and end caps firmly mounted to the cylinder. At least one of the end clamps has a piston passage therethrough to pass a piston rod which is attached to an internal piston. Pressure port means is provided to the inside of the cylinder to admit fluid under pressure to move the piston.

The above and other features of this invention will be fully understood from the following detailed description and the accompanying drawings in which:

FIG. 1 is a side elevation partly in cut-away cross-section showing the presently preferred embodiment of the invention;

FIG. 2 is a cross-section taken at line 2—2 of FIG. 1;

FIG. 3 is a side elevation partly in cut-away cross-section of another embodiment of the invention; and FIG. 4 is a right-hand view of FIG. 3.

FIG. 1 illustrates a fluid motor 10 which includes a cylinder 11. The cylinder has an internal bore 12 with a first and second end 13, 14, respectively, and a central axis 15.

Internal retainer grooves 16, 17 are formed in the wall of the bore, spaced from the ends of the cylinder. Retainers 18, 19 are seated in retainer grooves 16, 17, respectively.

FIG. 2 illustrates retainer groove 16 and shows a retainer 18 (to which retainer 19 is identical) that is formed in three ring segments 20, 21, 22, each segment preferably being approximately 110° in arc. The retainer segments project into the bore beyond the inside wall of the cylinder bore.

First and second end caps 25, 26 are provided at each of the ends of the cylinder. End cap 25 has a shoulder 27 for abutting the first end of the cylinder and has an internally threaded hole 28 with an axis coincident with central axis 15. End cap 26 likewise has a shoulder 29 and an internally threaded hole 30, also with an axis coincident with central axis 15.

First and second end clamps 35, 36 are placed at the first and second ends of the cylinder. End clamp 35 has an external shoulder 37 adapted to enter into the bore, forming a fairly close fit in the wall thereof. The clamp's diameter is reduced so that the shoulder hooks over the retainer and is retained by it. The shoulder also provides a wall 38 which helps confine an O-ring 39 for sealing the first end of the bore.

An externally threaded neck 40 makes threaded engagement in the hole in the end cap. In the particular embodiment shown, end clamp 35 also has a pressure port passage 41 into which a conduit member 42 can be threaded. The conduit member has a conduit 43 which supplies fluid under pressure to the first end of the bore. The particular conduit member shown is also illustrated as being a portion of a hinged mounting bracket 44, illustrating the ease and convenience with which this fluid motor can be mounted to surrounding structure.

End clamp 36 has an external shoulder 45 adapted to enter the second end of the bore and overhang ring 19. An externally threaded neck 46 is threaded into the hole in end cap 26. End clamp 36 has a piston rod passage 47 therethrough. It will be noted that no special provision is made for venting the second end of the cylinder, there being sufficient seepage and leakage around the piston rod in the piston rod passage to provide all the ventilation that is needed for the second end.

Within the cylinder and making a fluid sealing slidable fit therein, there is a piston 50 carrying a cup seal 51. A piston rod 52 is integral with the piston and passes through the piston rod passage. A return spring 53 is provided as an optional feature for returning the piston to the left in FIG. 1. When such a spring is used, it is customary to provide a retainer 54 adjacent to the piston.

FIG. 3 shows an alternate embodiment of a fluid motor 60 which involves provisions for rotationally aligning the end caps. This device includes a cylinder 61 with an internal bore 62 and a central axis 63. Retainers 64, 65 are seated in retainer grooves 66, 67 where they are borne against by end clamps 68, 69. The end clamps are threaded into end caps 70, 71, respectively. End clamp 68 has a pressure port passage 72, the same as end clamp 35 in FIG. 1, and in addition has wrench engaging surfaces 73. A convenient arrangement of these surfaces is as a hexagonal prism, or Allen head recess.

End clamp 69 similarly makes threaded engagement with end cap 71. It additionally includes an overhanging shoulder 74 which traps a sealing ring 75. The sealing ring seals around piston rod 76 which is slidable in piston rod passage 77 in end clamp 69. Integral with the piston rod, there is a piston 78 carrying a sealing ring 79 with it. It will be noted that in this embodiment, both ends of the bore are sealed by sealing rings 80, 81. Pressure can be applied at the left-hand end through pressure port passage 72. At the other end, a pressure port 82 is formed in end cap 71. The end clamp also has a connecting port 83 which interconnects the portion of the bore to the right of the piston with pressure port 82. The piston is thereby subject to pressure supplied at either of its faces.

The purpose of the wrench engaging surfaces 73 will be understood from an examination of FIG. 4. It will be seen that both end caps have flat surfaces such as surface 85 and it will be assumed for a moment that it is desired to have these surfaces lie in the same plane, that is, to be rotationally aligned. Rotational alignment is unimportant in FIG. 1, where the entire structure is round. However, where square end caps are used, alignment may be important. Therefore, in the construction of FIG. 3, the right-hand end is first tightened down. Then the outside surfaces of end cap 70 are aligned with those of end cap 71. Then the left-hand end is tightened down by placing a wrench in contact with surfaces 73 and turning the end clamp while the end cap is held in its aligned position. The assembly of the motors should be evident from the above. It has been found convenient to first put the piston in the cylinder and insert the end clamps into the ends of the cylinder, then to put the retainer segments in, using a little lubricant to temporarily hold them in the grooves, then to put the sealing rings in position and to tighten down the end caps. This is a very simple assembly procedure from the above, it will be seen that the dimensions of the end clamps and end caps are independent of cylinder length and that for any given cylinder bore, different stroke lengths can be provided merely by using a cylinder of different length. It will also be seen by comparing FIGS. 1 and 3 that unidirectional or bi-directional pneumatic or hydraulic forces may be utilized and that this conveniently assembled device can provide both for random and for adjusted rotational alignment of the various parts as needed.

This invention is not to be limited by the embodiments shown in the drawings and described in the description which are given by way of example and not of limitation, but only in accordance with the scope of the appended claims.

I claim:

1. A fluid motor comprising: a cylinder having a cylindrical internal bore with a first and a second end, a central axis, and an internal retainer groove in the wall of said bore adjacent to each of said ends; a first and a second end cap adapted to abut respective first and second ends of the cylinder, each of said caps having an internally threaded hole therethrough with an axis coincident with the said central axis; a retainer seated in each of said ring grooves and projecting into the bore; a first and a second end clamp; an external shoulder on each end clamp adapted to enter the bore and engage a respective retainer; an externally threaded neck on each end clamp adapted to enter and make threaded engagement in the threaded hole in the respective end cap, whereby the end cap is drawn against the cylinder end and the end clamp is drawn against the retainer when the respective end clamps and end caps are tightened down, thereby holding the end clamps and end caps mounted to the cylinder, one of said end clamps having an axial piston rod passage therethrough; a piston slidably fitted in the bore; a piston rod attached to the piston and passing through and projecting beyond the piston rod passage; pivotable cylinder mounting means including a mount, a pivot, an externally threaded neck member pivotally jointed to the mount by the pivot, and a conduit through the neck member; the other of the end clamps having a port formed axially therethrough; a port thread inside last named port, the neck member being threaded into the port thread, whereby the mount is adapted to pivotally support an end of the fluid motor and to provide a fluid pressure supply to the interior of the bore.

2. A fluid motor comprising: a cylinder having a cylindrical internal bore with a first and a second end, a central axis, and an internal retainer groove in the wall of said bore adjacent to each of said ends; a first and a second end cap adapted to abut respective first and second ends of the cylinder, each of said end caps having an internally threaded hole therethrough with an axis coincident with the said central axis; a retainer seated in each of said ring grooves and projecting radially into the bore; a first and a second end clamp; a shoulder on each end clamp adapted to enter the bore and to engage a respective retainer; an externally threaded neck on each end clamp adapted to enter and to make threaded engagement in the threaded hole in the respective end cap, whereby the end cap is drawn against the cylinder and the end clamp is drawn against the retainer when the respective end clamps and end caps are tightened down, thereby holding the end clamps and end caps mounted to the cylinder; a first and a second sealing ring disposed inside the cylinder between respective first and second end caps and retainers to make the following four fluid seals: with the respective retainer, with the wall of the bore, with the respective end cap, and with the respective end clamp, whereby leakage is prevented between the respective end cap and cylinder, and between the respective end clamp and end cap, one of said end clamps having an axial piston rod passage therethrough; a piston slidably fitted in the bore; a piston rod attached to the piston and passing through and projecting beyond the piston rod passage; and pressure port means opening into the internal bore for applying fluid under pressure to a face of the piston.

3. A fluid motor comprising: a cylinder having a cylindrical internal bore with a first and a second end, a central axis, and an internal retainer groove in the wall of said bore adajcent to each of said ends; a first and a second end cap adapted to abut respective first and second ends of the cylinder, each of said end caps having an internally threaded hole therethrough with an axis coincident with the said central axis; a retainer seated in each of said ring grooves and projecting radially into the bore; a first and a second end clamp; an external shoulder on each end clamp adapted to enter the bore and engage a respective retainer; an externally threaded neck on each end clamp adapted to enter and make threaded engagement in the threaded hole in the respective end cap, whereby the end cap is drawn against the cylinder and the end clamp is drawn against the retainer when the respective end clamps and end caps are tightened down, thereby holding the end clamps and the end caps mounted to the cylinder, one of said end clamps having an axial piston rod passage therethrough; a piston slidably fitted in the bore; a piston rod attached to the piston and passing through and projecting beyond the piston rod passage; pressure port means through the other of said end clamps comprising an axial port therethrough; and internal prismatic wrench-engaging means within said axial port enabling the end cap and end clamp to be independently held and turned so that the first end cap can be rotationally aligned relative to the second end cap.

4. A fluid motor according to claim 2 in which the retainers are segmented, and together comprise less than 360° of arc.

References Cited in the file of this patent

UNITED STATES PATENTS

| | | |
|---|---|---|
| 1,978,990 | Cross | Oct. 30, 1934 |
| 2,070,805 | Peterson | Feb. 16, 1937 |
| 2,230,286 | Cotner | Feb. 4, 1941 |
| 2,533,531 | Stephens | Dec. 12, 1950 |
| 2,670,717 | Armington | Mar. 2, 1954 |
| 2,719,766 | Densmore | Oct. 4, 1955 |
| 2,982,590 | Gunning | May 2, 1961 |